United States Patent
Reddy et al.

(10) Patent No.: US 7,325,613 B2
(45) Date of Patent: Feb. 5, 2008

(54) CROSSLINKABLE POLYMER COMPOSITIONS COMPRISING PHENOLS AND ASSOCIATED METHODS

(75) Inventors: B. Raghava Reddy, Duncan, OK (US); Julio E. Vasquez, Duncan, OK (US); Larry S. Eoff, Duncan, OK (US); Eldon Dwyann Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/592,339

(22) Filed: Nov. 3, 2006

(65) Prior Publication Data
US 2007/0044961 A1    Mar. 1, 2007

Related U.S. Application Data

(63) Continuation-in-part of application No. 11/170,237, filed on Jun. 28, 2005, and a continuation-in-part of application No. 11/170,280, filed on Jun. 28, 2005.

(51) Int. Cl.
*E21B 43/27* (2006.01)
(52) U.S. Cl. ................... 166/300; 166/294
(58) Field of Classification Search .............. None
See application file for complete search history.

(56) References Cited

U.S. PATENT DOCUMENTS

| | | | |
|---|---|---|---|
| 4,440,228 A * | 4/1984 | Swanson | 166/272.2 |
| 4,915,170 A * | 4/1990 | Hoskin | 166/270 |
| 5,219,475 A | 6/1993 | Lockhart et al. | 252/8.551 |
| 5,836,392 A | 11/1998 | Urlwin-Smith | 166/295 |
| 6,176,315 B1 | 1/2001 | Reddy et al. | 166/295 |
| 6,192,986 B1 | 2/2001 | Urlwin-Smith | 166/295 |
| 6,196,317 B1 | 3/2001 | Hardy | 166/295 |
| 6,607,035 B1 | 8/2003 | Reddy et al. | 166/295 |
| 6,667,279 B1 * | 12/2003 | Hessert et al. | 507/225 |
| 6,764,981 B1 | 7/2004 | Eoff et al. | 507/110 |
| 6,837,316 B2 * | 1/2005 | Reddy et al. | 175/64 |
| 6,843,841 B2 | 1/2005 | Reddy et al. | 106/162.2 |
| 7,091,160 B2 | 8/2006 | Dao et al. | 507/224 |
| 2005/0288190 A1 | 12/2005 | Dao et al. | 507/209 |

FOREIGN PATENT DOCUMENTS

WO    WO 01/74907 A1    10/2001

OTHER PUBLICATIONS

Search Report for European Patent Application No. 06253290.8, Mar. 7, 2007.

* cited by examiner

*Primary Examiner*—Zakiya W. Bates
*Assistant Examiner*—Angela DiTrani
(74) *Attorney, Agent, or Firm*—Robert A. Kent; Baker Botts, L.L.P.

(57) ABSTRACT

Crosslinkable-polymer compositions that comprise a chitosan-based compound and a phenol source, and associated methods, are provided. Various methods of use are also provided. In one embodiment, the methods comprise providing a crosslinkable-polymer composition comprising an aqueous fluid, a chitosan-based compound, a chitosan-reacting polymer, and a phenol source; introducing the crosslinkable-polymer composition into the portion of the subterranean formation; and allowing the crosslinkable-polymer composition to form a crosslinked gel in the portion of the subterranean formation.

20 Claims, No Drawings

CROSSLINKABLE POLYMER COMPOSITIONS COMPRISING PHENOLS AND ASSOCIATED METHODS

CROSS-REFERENCE TO RELATED APPLICATIONS

The present invention is related to co-pending U.S. application Ser. No. 11/592,484 entitled "Crosslinkable-Polymer Compositions Comprising Phenols and Associated Methods," filed concurrently herewith, and is a continuation-in-part of U.S. application Ser. No. 11/170,237, filed on Jun. 28, 2005, and of U.S. application Ser. No. 11/170,280, filed on Jun. 28, 2005, the entire disclosures of which are incorporated herein by reference.

BACKGROUND

The present invention relates to treatment fluids useful in subterranean applications and more particularly, to crosslinkable-polymer compositions that comprise a chitosan-based compound and a phenol source, and associated methods.

In certain subterranean formations, it may be desirable to mitigate the flow of fluids through a portion of the subterranean formation that is penetrated by a well. In some instances, it may be desirable to control the flow of fluids introduced into the well so that the flow of the fluid into high-permeability portions of the formation is mitigated. For example, in an injection well, it may be desirable to seal off high-permeability portions of a subterranean formation that otherwise would accept larger portions of an injected treatment fluid. By sealing off the high-permeability portions of the subterranean formation, the injected treatment fluid thus may penetrate less permeable portions of the subterranean formation more effectively. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

In other instances, it may be desirable to mitigate the production of undesired fluids (e.g., water) from the well. The production of water with oil and gas from wells constitutes a major problem and expense in the production of oil and gas. While oil and gas wells are usually completed in hydrocarbon-producing formations, a water-bearing zone occasionally may be adjacent to the hydrocarbon-producing formation. In some instances, the higher mobility of the water may allow it to flow into the hydrocarbon-producing formation by way of, among other things, natural fractures and high-permeability streaks. In some circumstances, the ratio of produced water to hydrocarbons may, over time, become sufficiently high that the cost of producing, separating, and disposing of the water may represent a significant economic loss.

One technique that may mitigate the flow of fluids through a portion of a subterranean formation has been to place crosslinkable-polymer compositions in a well bore so as to cause them to enter the portion of the subterranean formation such that they may crosslink therein. The crosslinking of these compositions tends to produce crosslinked gels, which may eliminate, or at least reduce, the flow of water or other undesirable fluids through the natural fractures and high-permeability streaks in the formations. One particular crosslinkable-polymer composition involves the use of chitosan to crosslink a water-soluble polymer, such as an acrylamide-based polymer.

Chitosan is a special member of a general class of polysaccharides or carbohydrate polymers in the sense that it is composed of aminoglucose units instead of glucose units. Chitosan is a beta-(1-4)-polysaccharide of D-glucosamine and is structurally similar to cellulose, except that the C-2 hydroxyl group in cellulose is substituted with a primary amine group in chitosan. All carbohydrates, including chitosan, thermally degrade at different rates when heated to temperatures about 300° F. Chitosan usually occurs in nature in small amounts and typically is biodegradable. Chitosan-degrading enzymes, namely chitinases, chitosanases, and lysozymes that degrade chitin-derived materials occur in bacteria, fungi, algae, mammals, birds, fish, etc. Chitosan is a partially or fully deacetylated form of chitin. Chitin is typically a naturally occurring polysaccharide. Structurally, chitin is a polysaccharide consisting of beta-(1-4)-2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species.

The time required for a crosslinkable-polymer composition to form the desired crosslinked gel can vary widely. This length of time, sometimes referred to as "gelation time," varies, depending on a number of factors, including the type of crosslinking agent used, the type of polymer used, the type of aqueous fluid used, concentrations of components used, the pH, the temperature, and a variety of other factors. Delaying the gelation of a crosslinkable-polymer composition may be desirable to allow, among other things, pumping of the composition to its desired location. The desired gelation time varies depending on the specific application. For instance, for wells of considerable depth or increased temperature, a longer gelation time may be required to deliver the crosslinkable-polymer composition to its desired destination before the composition forms the crosslinked gel.

In subterranean formations, a wide range of temperatures may be encountered that may present challenges to the use of crosslinkable-polymer compositions therein. For example, if the temperature of the subterranean formation is sufficiently high, the crosslinkable-polymer composition may gel prematurely. To counteract this possibility, oftentimes, the crosslinkable-polymer composition may be designed such that its gelation time is delayed or retarded. That is, the thickening and gelation characteristics of the crosslinkable-polymer composition may be altered such that the time it takes the crosslinkable-polymer composition to form a crosslinked gel is delayed for an amount of time sufficient to permit the crosslinkable-polymer composition to be pumped to its desired destination.

Oil well completion fluids such as drilling fluids, spacer fluids and flushes containing natural polymers, such as gums, starch and cellulose derivatives, for the purpose of fluid loss control or for particle suspension, also may become less stable at elevated temperatures. Treatment fluids such as conformance gel compositions (e.g. chitosan-containing gels) degrade at temperatures as low as 275° F. within a day or two, completely lose their gel structure, and become thin fluids. Thus, these compositions may not be suitable for high temperature applications. This is particularly the case when such compositions are designed for long term performance, such as conformance gels.

A number of methods for adjusting the gelation time and/or improving thermal stability of crosslinkable-polymer compositions have been used heretofore. For instance, the gelation time of the above mentioned crosslinkable-polymer chitosan compositions may be lengthened by increasing the number of bulky and/or less-reactive monomers in the selected polymer or polymers used. Alternatively, the thermal stablility of the above mentioned crosslinkable-polymer chitosan compositions may be lengthened by the addition of oxygen scavengers to minimize oxygen mediated thermal degradation. These modifications, however, still may be inadequate to provide the desired gelation times for certain applications. Furthermore, these modifications do not stop thermal degradation completely and still may be inadequate to provide the desired thermal stability for certain applications.

SUMMARY

The present invention relates to treatment fluids useful in subterranean applications and more particularly, to crosslinkable-polymer compositions that comprise a chitosan-based compound and a phenol source, and associated methods.

In one embodiment, the present invention provides a method of treating a portion of a subterranean formation. An example of such a method may comprise providing a crosslinkable-polymer composition comprising an aqueous fluid, chitosan, a chitosan-reacting polymer, and a phenol source; introducing the crosslinkable-polymer composition into the portion of the subterranean formation; and allowing the crosslinkable-polymer composition to form a crosslinked gel in the portion of the subterranean formation.

In one embodiment, the present invention provides a method of treating a portion of a subterranean formation. An example of such a method may comprise providing a crosslinkable-polymer composition comprising an aqueous fluid, chitosan, a chitosan-reacting polymer, a phenolic material comprising phloroglucinol dihydrate, and a gelation-retarding additive comprising acetic anhydride, wherein the crosslinkable-polymer composition has a gelation time sufficient to allow introduction of the crosslinkable-polymer composition into the portion of the subterranean formation; introducing the crosslinkable-polymer composition into the portion of the subterranean formation; and allowing the crosslinkable-polymer composition to form a crosslinked gel in the portion of the subterranean formation.

In one embodiment, the present invention provides a method of diverting a treatment fluid in a subterranean formation. An example of such a method may comprise providing a crosslinkable-polymer composition comprising an aqueous fluid, chitosan-based compound, a chitosan-reacting polymer, and a phenol source; introducing the crosslinkable-polymer composition into a first portion of the subterranean formation; allowing the crosslinkable-polymer composition to form a crosslinked gel in the first portion of the subterranean formation; providing the treatment fluid; introducing the treatment fluid into the subterranean formation; and allowing the crosslinked gel to at least substantially divert the treatment fluid to a second portion of the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to treatment fluids useful in subterranean applications and more particularly, to crosslinkable-polymer compositions that comprise a chitosan-based compound and a phenol source, and associated methods.

The crosslinkable-polymer compositions of the present invention generally comprise an aqueous fluid, a chitosan-based compound, a chitosan-reacting polymer, and a phenol source. The chitosan should react, under appropriate conditions (e.g., time, temperature, etc.) with the chitosan-reacting polymer to form a crosslinked gel. The term, "chitosan-reacting polymer," as used herein, encompasses amine-reacting polymers and polymers that are capable of reacting with the amine groups of chitosan. The term, "crosslinkable-polymer composition," as used herein, refers to a composition that under the appropriate conditions (e.g., time, temperature, etc.) forms a crosslinked gel. The term, "crosslinked gel," as used herein refers to a semi-rigid, jelly-like mass formed when a crosslinking interaction occurs. In one instance, the chitosan-reacting polymer and the chitosan-based compound interact through a crosslinking interaction to form a crosslinked gel. The term, "chitosan-reacting polymer," as used herein refers to a polymer capable of interacting with the chitosan-based compound. Inclusion of the phenol source, among other things, may enhance thermal stability of the crosslinkable-polymer compositions of the present invention. Inclusion of the phenol source also may accelerate the interaction and/or reaction between the chitosan-reacting polymer and the chitosan-based compounds in the crosslinkable-polymer compositions of the present invention.

In certain embodiments, the compositions and methods of the present invention may be useful to alter, block, and/or control the flow of fluids in subterranean formations. Moreover, the crosslinkable-polymer compositions of the present invention may possess desirable environmental properties for performing such operations.

The aqueous fluids used in the crosslinkable-polymer compositions of the present invention may include, but are not limited to, freshwater, seawater, saltwater, or brines (e.g., natural brines, formulated brines, saturated brines, unsaturated brines, etc.), or mixtures thereof. The aqueous fluid may be from any source, provided that it does not adversely affect the crosslinkable-polymer compositions of the present invention. Formulated brines may be made by dissolving one or more soluble salts in water, a natural brine, or seawater. Representative soluble salts include the chloride, bromide, acetate, and formate salts of potassium, sodium, calcium, magnesium, and zinc. The aqueous fluid may further comprise an organic or inorganic acid, or mixtures thereof, inter alia, to facilitate the dissolution of the chitosan-based compound, if desired. In certain embodiments, the aqueous fluid may be present in the crosslinkable-polymer compositions of the present invention in an amount in the range of from about 65% to about 99% or so by weight of the composition.

The crosslinkable-polymer compositions of the present invention generally comprise a chitosan-based compound. As used herein, the term "chitosan-based compound" is intended to include chitosan and chitosan salts of mineral or organic acids. The chitosan-based compound included in the crosslinkable treatment fluids of the present invention may include unoxidized chitosan, oxidized chitosan, modified chitosan, derivatives thereof, or mixtures thereof. The term "derivatives" is defined herein to include any compound that is made from one of the listed compounds, for example, by replacing one atom or group of atoms in the listed compound with another atom or group of atoms, rearranging two or more atoms in the listed compound, ionizing one of the listed compounds, or creating a salt of one of the listed compounds. Certain chitosans have a degree of deacetylation that is in the range of from about 50% to about 100%. In certain embodiments, such as commercially-available chitosan, the chitosan may have a degree of deacetylation that is in the range of from about 70% to 78%.

In certain embodiments, the chitosan-based compound may include an oxidized chitosan-based compound. Suitable chitosan-based compounds that may be oxidized include, but are not limited to, chitosan and chitosan salts of mineral or organic acids. A wide variety of oxidizers may be used. Examples of suitable oxidizers include, but are not limited to sodium hypochlorite, sodium chlorite, sodium persulfate, sodium periodate, hydrogen peroxide, organic peroxides, peracetic acid, derivatives thereof, and mixtures thereof.

In certain embodiments, the chitosan-based compound may include modified chitosan. The term, "modified chitosan," as used herein, refers to chitosan grafted or modified with additional functional groups, including, but not limited to, carboxymethyl groups, hydroxyethyl groups, hydroxypropyl groups, derivatives thereof, or combinations thereof. Other functional group modifications may be suitable as recognized by one skilled in the art with the benefit of this disclosure.

Under the appropriate conditions (e.g., time, temperature, etc.), the chitosan-based compound should interact with the chitosan-reacting polymer, inter alia, to form a crosslinked gel. Descriptions of crosslinked gels formed using chitosan as a crosslinking agent and methods of their use are described, at least in part, in U.S. Pat. Nos. 6,607,035 and 6,764,981, the relevant disclosures of which are herein incorporated by reference.

The chitosan-based compound should be included in the crosslinkable-polymer compositions of the present invention in an amount sufficient to provide the desired crosslinking interaction. In certain embodiments, the chitosan-based compound may be present in an amount in the range of from about 0.05% to about 5% by weight of the composition. When oxidized chitosan is used, the chitosan-based compound may be present in an amount up to about 15% by weight of the composition.

Chitosan-reacting polymers used in the present invention may include any suitable polymer or polymers that are capable of interacting with a chitosan-based compound. Generally, suitable polymers include, among others, those polymers comprising a carbonyl group, such as, for example, saturated or unsaturated acrylamide-based polymers. Examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, 2-acrylamido-2-methylpropane sulfonic acid/N—N-dimethylacrylamide/ acrylamide terpolymers, polyketones, acrylamide/t-butyl acrylate copolymers, oxidized polyvinyl alcohol, and water-soluble or water-dispersible polyesters (such as poly(lactic acid)), and mixtures and derivatives thereof. Those of ordinary skill in the art will recognize with the benefit of this disclosure that other polymers that react with chitosan-based compounds also may be used in the present invention.

In certain embodiments, the chitosan-reacting polymer comprising a carbonyl group includes a starch. In some embodiments, the starch is a low-molecular weight starch. Examples of suitable starches include, but are not limited to, corn starch, potato starch, waxy maize, dextrinized starch, derivatives thereof, and mixtures thereof. Suitable starches also may include oxidized starch. A wide variety of oxidizers can be used to oxidize starch to form the chitosan-reacting polymer. Examples of oxidizers suitable for use in the present invention include, but are not limited to, sodium hypochlorite, sodium periodate, hydrogen peroxide, peracetic acid, derivatives thereof, and mixtures thereof. Those skilled in the art, with the benefit of this disclosure, will appreciate that related oxidized polysaccharides, other than oxidized starch, may be used as a chitosan-reacting polymer, including oxidized cellulose, oxidized agarose, oxidized partially-acetylated cellulose, oxidized gums, derivatives thereof, and mixtures thereof. Other compounds that may be used include dialdehyde starch (DAS), dialdehyde cellulose, derivatives thereof, and mixtures thereof. In certain embodiments, the oxidized polysaccharides contain at least some ketone, aldehyde, or anhydride functional groups upon oxidation. In some embodiments, oxidized starches may be generated in situ by including a non-oxidized starch and a suitable oxidizer in the composition and allowing the oxidization to take place downhole under downhole conditions.

The chitosan-reacting polymer may be present in the crosslinkable-polymer compositions of the present invention in an amount sufficient to provide the desired delay before gelation and the desired crosslinking interaction. In certain embodiments, the chitosan-reacting polymers may be present in an amount in the range of from about 0.5% to about 20% by weight of the composition. In certain embodiments, the chitosan-reacting polymers may be present in an amount in the range of from about 0.6% to about 12% by weight of the composition.

Generally, by increasing the fraction of bulky or less-reactive monomers in the chitosan-reacting polymer, the temperature at which gelation of the crosslinkable-polymer composition occurs and/or the gelation time at a given temperature may be increased. One of ordinary skill in the art, with the benefit of this disclosure, will recognize an appropriate chitosan-reacting polymer based on, among other factors, the temperature of the formation and the desired pumping time.

To further modify the gelation time and other properties of the crosslinkable-polymer compositions of the present invention, the weight ratio of the chitosan-reacting polymer to the chitosan may be varied. For example, variations in the concentration of chitosan may be varied to effect the gelation time, e.g. a lower concentration of chitosan generally results in longer gelation times, and a higher concentration of chitosan generally results in shorter gelation times. In some embodiments, the weight ratio of chitosan-reacting polymer-to-chitosan may be in the range of from about 400:1 to about 1:15. In some embodiments, the weight ratio of chitosan-reacting polymer-to-chitosan may be in the range of from about 50:1 to about 1.1:1.

The crosslinkable-polymer compositions of the present invention generally comprise a phenol source. As used herein, the term "phenol source" refers to phenol, phenolic material, or phenol generating material. As used herein, the terms "phenol" or "phenolic material" refer to any compound which contains a six-membered aromatic ring, bonded directly to a hydroxyl group (—OH). As used herein, the term "phenol generating material" refers to any material which generates or has the potential to generate phenol or phenolic material in the composition under downhole conditions. The addition of a phenol source to well treatment fluids may function as initiators or activate the crosslinking reaction. Among other things, the addition of a phenol source to well treatment fluids may enhance the thermal stability of polysaccharides and chitosan based compositions.

The phenol or phenolic material included in the crosslinkable treatment fluids of the present invention may include a polyhydric phenol, which is phenol containing one or more hydroxyl groups attached to one or more aromatic nuclei. Suitable examples of an aromatic molecule containing more than one hydroxyl group include dihydroxy benzene such as resorcinol, hydroquinone, catechol, vanillin, vanilic acid, tyrosine, and alpha- or beta-hydroxynapthalene; and trihydroxybenzenes such as phloroglucinol, pyrogallol, trihydroxy benzoic acids such as 2,3,4-trihydroxy benzoic acid, 2,4,6-trihydroxy benzoic acid, gallic acid and the like. In certain embodiments, phloroglucinol may be the preferred aromatic molecule. In certain embodiments, the polyhydric phenol is phenolphthalein. In certain embodiments, the phenolic materials of the present invention may be water soluble at application temperatures. Examples of phenol generating materials include acetyl salicylic acid, phenyl acetate, para-nitrophenyl acetate, tris(nonylphenylphosphite) and triphenylphosphite and the like.

The phenol source generally should be included in the crosslinkable-polymer compositions of the present invention in an amount sufficient to provide the desired thermal stability and/or activate the crosslinking interaction. In certain embodiments, the phenol source may be present in an amount in the range of from about 0.01% to about 5% by weight of the composition. In certain embodiments, the phenol source may be present in an amount in the range of from about 1.25% to about 3.0% by weight of the composition.

The crosslinkable-polymer compositions of the present invention may further comprise a gelation-retarding additive. The term, "gelation-retarding additive," as used herein refers to an additive that acts to at least partially delay the crosslinking interaction, e.g., the gelation of the crosslinkable-polymer compositions. Inclusion of the gelation-retarding additive in the crosslinkable-polymer compositions of the present invention, among other things, may delay this crosslinking interaction, e.g., the gelation of the crosslinkable-polymer compositions, so that the crosslinkable-polymer compositions may be used in a wider range of applications than otherwise would be possible. Delaying the gelation of the crosslinkable-polymer compositions may be desirable to increase the pumping time to allow placement of the composition in the desired location before gelation at a given temperature. In certain embodiments, the crosslinkable-polymer compositions of the present invention may have a gelation time of from about 2 hours to about 96 hours. In certain embodiments, the crosslinkable-polymer compositions of the present invention may have a gelation time sufficient to allow delivery of the crosslinkable-polymer composition to the desired portion of a subterranean formation before crosslinkable-polymer composition becomes too viscous to enter the formation permeability without requiring excessive pump pressures. The addition of a gelation-retarding additive may allow the crosslinkable-polymer compositions of the present invention to be used at higher temperatures than otherwise would be possible without the gelation-retarding additive. Selection of the amount and type of gelation-retarding additive included in the crosslinkable-polymer compositions of the present invention depends on a number of factors which affect gelation time, including the type of crosslinking agent used, the type of the chitosan-reacting polymer used, the type of aqueous fluid used, concentrations of components used, the pH, the temperature, and a variety of other factors. Depending on these factors, the type and amount of gelation retarders may be selected such that the gelation time is in the 2 to 96 hours range under downhole conditions.

Gelation-retarding additives suitable for use in the crosslinkable-polymer compositions of the present invention may include an acid derivative. Examples of suitable acid derivatives may include organic acid derivatives and inorganic acid derivatives. Organic acid derivatives include, but are not limited to, carboxylic acid anhydrides, organic sulfonic acid derivatives such as, for example, sulfonyl chloride, and sulfonamides, and the like. Specific examples include, but are not limited to, sulfanilbenzoic acid, sulafanilamide, sulfanilic acid, Chloramine T, Chloramine B, and the like. Inorganic acid derivatives include, but are not limited to, acid chlorides, esters and amides of mineral acids such as, for example, chlorosulfonic acid, sulfamide, dialkyl carbonate, dimethyl carbonate, and mixtures thereof. Examples of carboxylic acid anhydrides include, but are not limited to, acetic anhydride, propionic anhydride, succinic anhydride, maleic anhydride, derivatives thereof, and mixtures thereof. Generally, the acid derivatives of the present invention may have some water solubility or some water dispersibility. Other carboxylic acid derivatives suitable as gelation-retarding additives include, but are not limited to esters, acid chlorides, amides, and mixtures thereof. Specific examples of these classes include, but are not limited to, acetyl chloride, butyl acetate, acetamide, and mixtures thereof.

The gelation-retarding additive generally should be included in the crosslinkable-polymer compositions of the present invention in an amount sufficient to provide the desired retardation of gelation. In certain embodiments, the gelation-retarding additive may be present in an amount in the range of from about 0.1% to about 10% by weight of the composition.

The crosslinked gel formed by the interaction and/or reaction of the chitosan-reacting polymer and the chitosan should be stable for the desired period of time in a subterranean formation. For example, a relatively short gel stability may be preferred for temporarily sealing a portion of a subterranean formation, while a crosslinked gel having a longer stability may be useful in mitigating the flow of water from a formation into the well bore in producing wells or in sealing off high-permeability portions of a subterranean formation that would otherwise accept larger portions of an injected treatment fluid. In some embodiments, the crosslinkable-polymer composition should be thermally stable in downhole temperatures. As used herein, the term "downhole temperatures" refers to the temperatures of a subterranean formation. In some cases, downhole temperatures may range from about 50° F. to about 180° F. In other cases, downhole temperatures may range from about 181° F. to about 450° F. A person of ordinary skill in the art, with the benefit of this disclosure, will recognize the appropriate stability for a desired application.

Generally, the methods of the present invention allow for treating a portion of a subterranean formation with the crosslinkable-polymer compositions of the present invention. In certain embodiments, the present invention provides a method of treating a portion of a subterranean formation comprising: providing a crosslinkable-polymer composition comprising an aqueous fluid, chitosan, a chitosan-reacting polymer, and a phenol source; introducing the crosslinkable-polymer composition into the portion of the subterranean formation; and allowing the crosslinkable-polymer composition to form a crosslinked gel in the portion of the subterranean formation. In certain embodiments, the crosslinked gel may modify the permeability of a portion of a subterranean formation, and thus may mitigate the undesired flow of fluids therethrough. In some embodiments, mitigation of the flow may eliminate or at least reduce the fluid flow therethrough. In another embodiment, mitigation of the fluid flow may divert a treatment fluid, such as an acidizing treatment fluid, from a high-permeability, water-producing portion of a formation to the desired treatment area of a hydrocarbon-producing portion of the formation.

In certain embodiments, the present invention provides a method of diverting a treatment fluid in a subterranean formation comprising: providing a crosslinkable-polymer composition comprising an aqueous fluid, chitosan, a chitosan-reacting polymer, and a phenol source; introducing the crosslinkable-polymer composition into a portion of the subterranean formation; allowing the crosslinkable-polymer composition to form a crosslinked gel in the portion of the subterranean formation; providing the treatment fluid; introducing the treatment fluid into the subterranean formation; and allowing the crosslinked gel to at least substantially divert the treatment fluid to another portion of the subterranean formation. The diversion of treatment fluids in subterranean operations may be desirable in a variety of subterranean operations, including acid stimulation operations, injection operations, scale inhibition operations, and clay stabilization operations. In many instances, diversion may be desirable because the treatment fluid may preferentially enter portions of a subterranean formation with high permeability, which may hinder the treatment of another portion of the subterranean formation with less permeability.

To facilitate a better understanding of the present invention, the following examples of certain aspects of some embodiments are given. In no way should the following examples be read to limit, or define, the scope of the invention.

EXAMPLES

Example 1

Various sample fluids were prepared by combining cationic starch NSIGHT C-1™ commercially available from AlcoChemical Company (9% by weight of composition), chitosan CHITOCLEAR® commercially available from Primex Company (0.67% by weight of composition), and phloroglucinol dihydrate in fresh water. The amount of phloroglucinol dihydrate included in each sample fluid was varied. Once prepared, gelation times of the crosslinkable-polymer compositions were measured at various temperatures for the various sample fluids. The gelation times for the sample fluids were measured using a sealed-tube method. A 16 mm×150 mm borosilicate glass tube with a cap was filled with a sample fluid to approximately one-third of its capacity. The tube was purged with nitrogen, and the screw cap was sealed with a high-temperature silicone sealant. Additionally, a TEFLON® (polytetrafluoroethylene) plug was used inside the cap. The tube was then placed inside a heavy steel container, and the container was placed in a preheated oven set at the test temperature indicated in Table 1. The steel container was taken out periodically and the tube removed for observation. The gelation time for this example was the time required for the sample fluid to reach a specified gel strength based on the visual evaluation.

Table 1 shows gelation time measurements for each of the sample fluids that were prepared.

TABLE 1

Gelation Times for Various Sample Gels Comprising Phloroglucinal Dihydrate

| Temperature (° F.) | Phloroglucinal Dihydrate (%) | Gelation Time (Hours) |
| --- | --- | --- |
| 180 | 3.00 | 1.47 |
| 180 | 1.25 | 3.80 |
| 200 | 1.25 | 1.27 |
| 200 | 0.2 | 2.88 |
| 200 | 0.1 | 4.08 |
| 200 | 0.05 | 6.12 |

As Table 1 illustrates, phloroglucinol dihydrate may be included in a crosslinkable-polymer composition comprising a chitosan-based compound to vary the gelation time.

Example 2

Various sample fluids were prepared by combining cationic starch NSIGHT C-1™ commercially available from AlcoChemical Company (9% by weight of composition), chitosan CHITOCLEAR® commercially available from Primex Company (0.67% by weight of composition), and phenolic material in water. The amount and type of phenolic material included in each sample fluid was varied. Once prepared, gelation times of the crosslinkable-polymer compositions were measured at various temperatures for the various sample fluids. The gelation times for the sample fluids were measured using a sealed-tube method. A 16 mm×150 mm borosilicate glass tube with a cap was filled with a sample fluid to approximately one-third of its capacity. The tube was purged with nitrogen, and the screw cap was sealed with a high-temperature silicone sealant. Additionally, a TEFLON® (polytetrafluoroethylene) plug was used inside the cap. The tube was then placed inside a heavy steel container, and the container was placed in a preheated oven set at the test temperature indicated in Table 2. The steel container was taken out periodically and the tube removed for observation. The gelation time for this example was the time required for the sample fluid to reach a specified gel strength based on the visual evaluation.

Table 2 shows gelation time measurements for each of the sample fluids that were prepared.

TABLE 2

Gelation Times for Various Sample Gels Comprising Phenolic Material

| Temperature (° F.) | Phenolic Material | Gelation Time (Hours) |
| --- | --- | --- |
| 250 | 1.25% Phenol | Gelled in 2-3 days, stable for a week |
| 250 | 1.25% Resorcinol | Gelled in 2-3 days, stable for a week |
| 250 | 1.25% Salicylic Acid | Gelled in 1-2 days, stable for a week |
| 300 | 1.25% Phenol | Gelled in 1-2 days, stable for a week |
| 300 | 1.25% Resorcinol | Gelled in 1-2 days, stable for a week |
| 300 | 1.25% Salicylic Acid | Gelled in 1-2 days, stable for a week |

TABLE 2-continued

Gelation Times for Various Sample
Gels Comprising Phenolic Material

| Temperature (° F.) | Phenolic Material | Gelation Time (Hours) |
|---|---|---|
| 200 | 1% Resorcinol 0.1% Phloroglucinal Dihydrate | 4.78 |
| 200 | 1% Resorcinol 0.05% Phloroglucinal Dihydrate | 6.25 |
| 200 | 1% Salicylic Acid 0.1% Phloroglucinal Dihydrate | 58.77 |
| 200 | 0.5% Salicylic Acid 0.1% Phloroglucinal Dihydrate | 16.78 |
| 200 | 0.3% Salicylic Acid 0.1% Phloroglucinal Dihydrate | 13.88 |
| 200 | 0.1% Salicylic Acid 0.1% Phloroglucinal Dihydrate | 9.93 |

As Table 2 illustrates, phenolic materials may be included in a crosslinkable-polymer composition comprising a chitosan-based compound to vary the gelation time of the composition.

Example 3

A base crosslinkable-polymer composition was prepared by combining water, 7% by weight active copolymer of acrylamide and t-butyl acrylate commercially available under the tradename HZ-10 from Halliburton Energy Services, and a chitosan solution (0.5% active in a 2% KCl solution). Eight different samples were created from this base composition, to which different additives were added to each of seven of the samples at 1.25% by weight of the composition, and no additive was added to one of the samples. The type of additive(s) included in each sample gel was varied. Each of the sample solutions had a viscosity of greater than about 20 centipoise prior to exposure to elevated temperatures. Once prepared, the thermal stability of the sample gels was measured at 300° F. for at least 30 days. The thermal stability for the sample gels was determined by visual evaluation. Table 3 shows the additives included in each of the sample gels that were prepared and the visual observation of their stabilities after several days.

TABLE 3

Thermal Stability of Various Sample Gels

| Additive Concentration | Days stored at 300° F., days | | | | | | | |
|---|---|---|---|---|---|---|---|---|
| | 1 | 3 | 5 | 7 | 10 | 14 | 21 | 30 |
| (No Additive) | X | | | | | | | |
| Phloroglucinol Dihydrate | X | X | X | X | X | X | X | X |
| Phloroglucinol Dihydrate + Triphenyl Phosphite | X | X | X | X | | | | |
| Triphenyl Phosphite | X | | | | | | | |
| Cysteine Hydrochloride Monohydrate | X | X | | | | | | |
| Cysteine L -(+)- | X | X | | | | | | |
| L (−) Cysteine | X | X | | | | | | |
| Ascorbic Acid | X | X | | | | | | |

(X = stable)

As Table 3 illustrates, phloroglucinol dihydrate may be included in a crosslinkable-polymer composition comprising a chitosan-based compound to raise the upper temperature limit of the composition to at least 300° F.

Example 4

Five sample gels of a crosslinkable-polymer composition comprising 7% by weight active HZ-10 copolymer, a chitosan solution (0.5% active in a 2% KCl solution), and various concentrations of phloroglucinol dihydrate were created. The thermal stability for the sample gels was determined by visual evaluation. Table 4 shows the concentrations of phloroglucinol dihydrate by weight of the composition included in each of the sample gels that were prepared and the visual observation of their stabilities after several days.

TABLE 4

Thermal Stability of Various Sample Gels
Comprising Phloroglucinol Dihydrate

| Phloroglucinol Dihydrate, % | Days stored at 300° F., days | | | | | | |
|---|---|---|---|---|---|---|---|
| | 1 | 3 | 5 | 7 | 14 | 21 | 30 |
| 2.50 | X | X | X | X | X | X | X |
| 1.25 | X | X | X | X | X | X | X |
| 0.50 | X | X | X | | | | |
| 0.13 | X | X | | | | | |
| 0.00 | X | | | | | | |

(X = stable)

Thus, these results show that the thermal stability of crosslinkable polymer compositions comprising chitosan-based compound may increase with the concentration of phloroglucinol dihydrate therein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of treating a portion of a subterranean formation, comprising:
   providing a crosslinkable-polymer composition comprising an aqueous fluid, a chitosan-based compound, a chitosan-reacting polymer, and a phenol source;
   introducing the crosslinkable-polymer composition into the portion of the subterranean formation; and allowing the chitosan-based compound to interact with the chitosan-reacting polymer to form a crosslinked gel in the portion of the subterranean formation.

2. The method of claim 1 wherein the chitosan-based compound is present in an amount in the range of from about 0.05% to about 5% by weight of the crosslinkable-polymer composition.

3. The method of claim 1 wherein the chitosan-reacting polymer is present in an amount in the range of from about 0.5% to about 20% by weight of the crosslinkable-polymer composition.

4. The method of claim 1 wherein the chitosan-reacting polymer comprises a carbonyl group.

5. The method of claim 1 wherein the chitosan-reacting polymer comprises an acrylamide-based polymer.

6. The method of claim 1 wherein the chitosan-reacting polymer comprises an oxidized polysaccharide.

7. The method of claim 1 wherein the chitosan-reacting polymer comprises a starch.

8. The method of claim 1 wherein the chitosan-reacting polymer comprises a starch, and the method further comprises allowing the phenol source to accelerate a crosslinking reaction between the chitosan-based compound and the chitosan-reacting polymer.

9. The method of claim 1 wherein the phenol source is a polyhydric phenol.

10. The method of claim 1 wherein the crosslinkable-polymer composition further comprises a gelation-retarding additive comprising an acid derivative.

11. The method of claim 10 wherein the gelation-retarding additive is present in an amount in the range of from about 0.1% to about 10% by weight of the crosslinkable-polymer composition.

12. The method of claim 10 wherein the gelation-retarding additive comprises at least one gelation-retarding additive selected from the group consisting of: a carboxylic acid anhydride, an organic sulfonic acid derivative, and any combination thereof.

13. The method of claim 1 wherein the crosslinkable-polymer composition has a gelation time of about 2 hours to about 96 hours.

14. The method of claim 1 wherein the chitosan-reacting polymer comprises at least one chitosan-reacting polymer selected from the group consisting of: a polyacrylamide, an acrylamide copolymer, a polyvinyl pyrrolidone, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N-N-dimethylacrylamide/acrylamide terpolymer, a polyketone, an acrylamide/t-butyl acrylate copolymer, an oxidized polyvinyl alcohol, a poly(lactic acid), a water soluble polyester, a water dispersible polyester, any derivative thereof, and any combination thereof.

15. A method of treating a portion of a subterranean formation, comprising:
providing a crosslinkable-polymer composition comprising an aqueous fluid, chitosan, a chitosan-reacting polymer, a phenolic material comprising phloroglucinol dihydrate, and a gelation-retarding additive comprising acetic anhydride, wherein the crosslinkable-polymer composition has a gelation time sufficient to allow introduction of the crosslinkable-polymer composition into the portion of the subterranean formation;
introducing the crosslinkable-polymer composition into the portion of the subterranean formation; and
allowing the crosslinkable-polymer composition to form a crosslinked gel in the portion of the subterranean formation.

16. A method of diverting a treatment fluid in a subterranean formation comprising:
providing a crosslinkable-polymer composition comprising an aqueous fluid, chitosan-based compound, a chitosan-reacting polymer, and a phenol source;
introducing the crosslinkable-polymer composition into a first portion of the subterranean formation;
allowing the chitosan-based compound to interact with the chitosan-reacting polymer to form a crosslinked gel in the first portion of the subterranean formation;
providing the treatment fluid;
introducing the treatment fluid into the subterranean formation; and
allowing the crosslinked gel to at least partially divert the treatment fluid to a second portion of the subterranean formation.

17. The method of claim 16 wherein the chitosan-reacting polymer comprises an acrylamide-based polymer.

18. The method of claim 16 wherein the phenol source is a polyhydric phenol.

19. The method of claim 16 wherein the crosslinkable-polymer composition further comprises a gelation-retarding additive comprising an acid derivative.

20. The method of claim 19 wherein the acid derivative is selected from the group consisting of carboxylic acid anhydrides, organic sulfonic acid derivatives, and mixtures thereof.

* * * * *